United States Patent
Claycomb et al.

(10) Patent No.: US 9,740,793 B2
(45) Date of Patent: Aug. 22, 2017

(54) EXPOSING FRAGMENT IDENTIFIERS

(71) Applicant: International Business Machines Corporation, Armonk, NY (US)

(72) Inventors: Matthew R. Claycomb, Austin, TX (US); Trenton J. Johnson, Raleigh, NC (US); Dana L. Price, Surf City, NC (US); Charmant K. Tan, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 14/487,258

(22) Filed: Sep. 16, 2014

(65) Prior Publication Data
US 2016/0078144 A1    Mar. 17, 2016

(51) Int. Cl.
| | | |
|---|---|---|
| G06F 3/048 | (2013.01) | |
| G06F 17/30 | (2006.01) | |
| H04L 29/08 | (2006.01) | |
| G06F 3/0482 | (2013.01) | |
| G06F 3/0484 | (2013.01) | |

(52) U.S. Cl.
CPC ...... G06F 17/30896 (2013.01); G06F 3/0482 (2013.01); G06F 3/04842 (2013.01); G06F 17/30884 (2013.01); G06F 17/30887 (2013.01); H04L 67/02 (2013.01)

(58) Field of Classification Search
CPC ... G06F 17/211; G06F 17/218; G06F 17/2235
USPC .................... 715/205, 206, 234
See application file for complete search history.

(56) References Cited

U.S. PATENT DOCUMENTS

| | | | |
|---|---|---|---|
| 6,249,844 B1 | 6/2001 | Schloss et al. | |
| 7,840,590 B2 | 11/2010 | Tam et al. | |
| 7,899,829 B1 | 3/2011 | Malla | |
| 7,984,037 B2 | 7/2011 | Wan et al. | |
| 8,042,036 B1* | 10/2011 | Sharma | G06F 17/30882 715/208 |
| 8,150,824 B2 | 4/2012 | Marmaros et al. | |
| 8,181,116 B1 | 5/2012 | Amacker et al. | |
| 8,230,320 B2 | 7/2012 | Brooks et al. | |
| 2003/0204815 A1* | 10/2003 | Edwards | G06F 17/30899 715/205 |
| 2004/0044785 A1 | 3/2004 | Bell et al. | |

(Continued)

OTHER PUBLICATIONS

"Matt Cutts: Gadgets, Google, and SEO: Start an embedded YouTube video at a certain timestamp", referred to as MattCutts in the Office Action, retrieved from https://www.mattcutts.com/blog/start-youtube-video-minutes-seconds/, posted Mar. 3, 2010.*

(Continued)

*Primary Examiner* — Stephen Hong
*Assistant Examiner* — Sanchita Roy
(74) *Attorney, Agent, or Firm* — David B. Woycechowsky

(57) ABSTRACT

In an approach for exposing fragment identifiers within an information resource, a processor receives a markup language document of an information resource. A processor identifies a fragment identifier within the markup language document and a location within the information resource corresponding to the fragment identifier. A processor presents the information resource and an indication of the location within the information resource corresponding to the fragment identifier.

3 Claims, 4 Drawing Sheets

(56) References Cited

U.S. PATENT DOCUMENTS

| | | | |
|---|---|---|---|
| 2004/0139169 A1 | 7/2004 | O'Brien et al. | |
| 2004/0205500 A1* | 10/2004 | Brown | G06F 17/30882 |
| | | | 715/207 |
| 2004/0267724 A1* | 12/2004 | Hoffman | G06F 17/30882 |
| 2006/0031411 A1* | 2/2006 | Gimson | G06F 17/30905 |
| | | | 709/219 |
| 2006/0075327 A1 | 4/2006 | Sriver | |
| 2008/0263441 A1* | 10/2008 | Park | G06F 17/30884 |
| | | | 715/241 |
| 2008/0307308 A1 | 12/2008 | Sullivan et al. | |
| 2012/0216102 A1* | 8/2012 | Malla | G06F 17/241 |
| | | | 715/206 |
| 2014/0019862 A1* | 1/2014 | Fink | G06F 17/3082 |
| | | | 715/719 |
| 2014/0365886 A1* | 12/2014 | Koenig | G06F 3/04817 |
| | | | 715/711 |

OTHER PUBLICATIONS

Claycomb et al., "Exposing Fragment Identifiers", USPTO U.S. Appl. No. 15/018,996, filed Feb. 9, 2016, 24 pages.

IBM, Appendix P, List of IBM Patents or Patent Applications Treated As Related, 2 pages, dated Feb. 9, 2016.

Louis Lazaris; "A Call for Better Fragment Identifiers"; IW; Feb. 2, 2012; Copyright 2008-2014 Impressive Webs; Toronto; <http://www.impressivewebs.com/better-fragment-idnetifiers>.

Zehua Liu, et al.; "An Automated Algorithm for Extracting Website Skeleton"; School of Computer Engineering Nanyang Technological University; Singapore; Dec. 8, 2003.

* cited by examiner

EXPOSING FRAGMENT IDENTIFIERS

BACKGROUND OF THE INVENTION

The present invention relates generally to the field of web browsing, and more particularly to identifying and exposing fragment identifiers to users.

A web browser is a software application for retrieving, presenting, and navigating information resources on the World Wide Web. An information resource may be a web document, image, video, or other piece of content or collection of content. Information resources are described with a markup language, the most common of which is Hypertext Markup Language (HTML). A web browser interprets the markup language documents and converts the markup language document to visible and/or audible web pages.

Web browsers are able to identify an information resource by receiving a Uniform Resource Identifier (URI). A URI is a string of characters unique to a particular information resource. A user may wish to utilize a bookmark to access a specific information resource. In the context of web browsers, a bookmark is a URI that is stored for later retrieval in any of various storage formats. Many modern web browsers include a bookmark feature. Bookmarks are often referred to as "favorites" or "internet shortcuts" within a web browser.

Within an information resource's markup language document there may be short strings of characters called fragment identifiers that identify specific sections within the information resource. A fragment identifier may be appended to the information resource's URI by following the URI string with a hash mark (#), which is then followed by the fragment identifier string.

SUMMARY

Aspects of an embodiment of the present invention disclose a method, computer program product, and computer system for exposing fragment identifiers within an information resource. A processor receives a markup language document of an information resource. A processor identifies a fragment identifier within the markup language document and a location within the information resource corresponding to the fragment identifiers. A processor presents the information resource and an indication of the location within the information resource corresponding to the fragment identifier.

DETAILED DESCRIPTION

A web browser is able to identify an information resource when the web browser receives that information resource's uniform resource identifier (URI). An information resource's markup language document may contain fragment identifiers. A fragment identifier is a string of characters that refer to a section within an information resource, such as a specific paragraph, a specific section, an image, a video, a timestamp within a video, a hyperlink, or any other separate section within a web document. If an information resource's markup language (e.g., HyperText Markup Language (HTML)) has fragment identifiers, the fragment identifiers may be appended to the information resource's URI by following the URI string with a hash mark (#), which is then followed by the fragment identifier. For example, www.website.com/article#fragment_identifier. Such a combined string of text (a URI followed by a hash mark followed by a fragment identifier) is hereinafter referred to as a fragment resource identifier. If a web browser receives such a fragment resource identifier, the web browser will navigate to the specific section of the information resource that corresponds to the fragment identifier. Embodiments of the present invention recognize that current web browsers do not make users aware of the location or existence of fragment identifiers within an information resource, although the information resource may be designed to do so (e.g., a web designer including a "table of contents" section). Embodiments of the present invention would allow web browsers to expose existing fragment identifiers to users, such that users are able to navigate and re-navigate to a specific section or element within an information resource.

Figure 1:
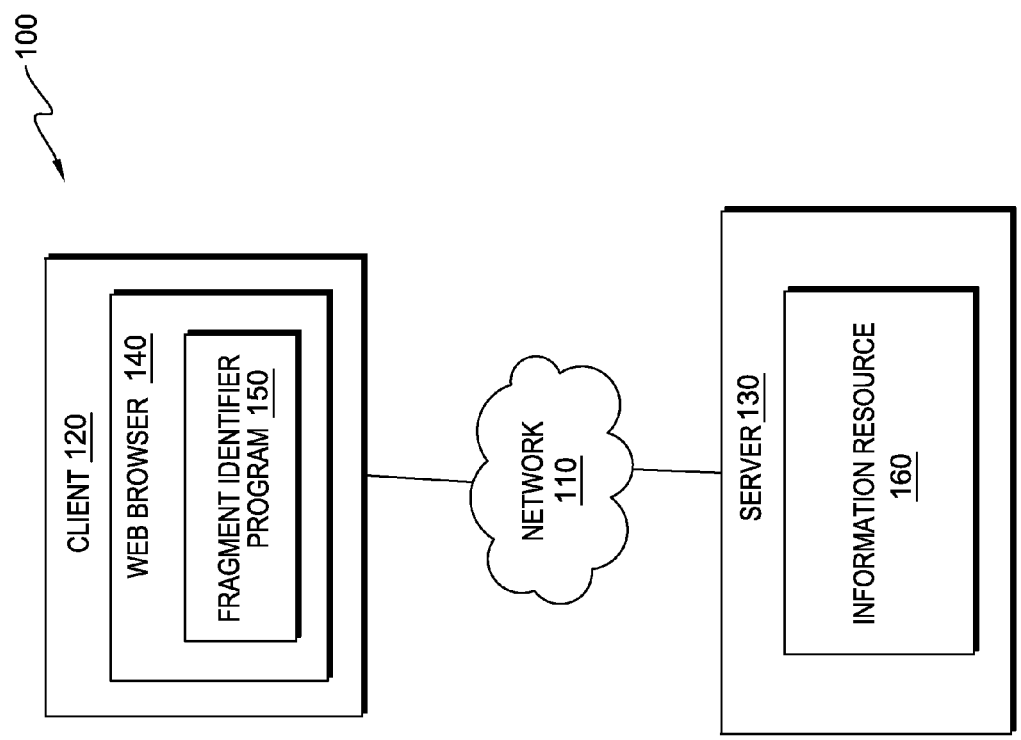
FIG. 1 is a functional block diagram illustrating a distributed data processing environment, in accordance with one embodiment of the present invention.

The present invention will now be described in detail with reference to the Figures. FIG. 1 is a functional block diagram illustrating a distributed data processing environment, generally designated 100, in accordance with one embodiment of the present invention. Data processing environment 100 includes client 120 and server 130 interconnected over network 110. Network 110 is a medium used to provide communication links between various devices and computers connected within network data processing environment 100. Network 110 may be a local area network (LAN), a wide area network (WAN) such as the Internet, any combination thereof, or any combination of connections and protocols that will support communications between server 130 and client 120, in accordance with embodiments of the invention. Network 110 may include connections such as wire, wireless, communication links, or fiber optic cables. Data processing environment 100 may include additional servers, clients, information resources, and other devices not illustrated.

Server 130 may be a management server, a web server, or any other electronic device or computing system capable of processing program instructions and receiving and sending data. In some embodiments, server 130 may be a laptop computer, tablet computer, personal computer (PC), desktop computer, or any programmable electronic device capable of communicating with client 120 via network 110. In other embodiments, server 130 may represent a server computing system utilizing multiple computers as a server system, such as in a cloud computing environment. In another embodiment, server 130 represents a computing system utilizing clustered computers and components to act as a single pool of seamless resources. Server 130 includes information resource 160. In other embodiments, server 130 may include additional information resources not shown. Server 130 may include components, as depicted and described in further detail with respect to FIG. 4.

Information resource 160 may be any web page, image, video, or other piece of information content accessible to other computing devices, such as client 120, by a web browser over network 110. Information resource 160 is described by a markup language (e.g., HTML) and may include one or more fragment identifiers within the markup language description. Information resource 160 may be accessible by a uniform resource locator (URL) or other URI assigned to information resource 160. In one embodiment, information resource 160 resides on server 130. In other embodiments, information resource 160 may reside on another server or another computing device, provided that information resource 160 is accessible to web browser 140 and fragment identifier program 150.

Client computing device 120 may be, for example, a personal computer, desktop computer, laptop computer, netbook computer, tablet computer, personal digital assistant (PDA), smart phone, or other computation and/or communication device. In general client 120 may be any electronic device or computing system capable of processing program instructions and sending and receiving data information and communicating with server 130 over network 110. Client 120 contains web browser 140 and fragment identifier program 150. Client 120 may include components, as depicted and described in further detail with respect to FIG. 4.

Web browser 140 may be a generic web browser used to retrieve, present, and traverse information resources on the Internet. Web browser 140 is located in client 120. In general, web browser 140 may be any software application that enables a user at client 120 to access information resource 160 over network 110. Web browser 140 identifies information resource 160 by information resource 160's uniform resource identifier (URI). In some embodiments, web browser 140 accesses information resource 160, which may be described by a markup language document or file. In such an embodiment, web browser 140 interprets the markup language document with a software platform and displays information resource 160 to a user accessing information resource 160 at client 120.

Fragment identifier program 150 operates to identify and expose fragment identifiers located within information resource 160 and/or additional information resources (not shown). Information resource 160's markup language document may contain one or more fragment identifiers. Fragment identifiers are short strings of characters within an information resource's markup language document that reference a specific section or other element within information resource 160 (e.g., a specific paragraph of a web document). In one embodiment fragment identifier program 150 is a function of web browser 140. In another embodiment fragment identifier program 150 is a separate software application capable of communicating with web browser 140. In the depicted embodiment, fragment identifier program 150 resides on client 120. In other embodiments, fragment identifier program 150 may reside on another computing device, provided fragment identifier program 150 is capable of accessing information resource 160 and web browser 140, and provided fragment identifier program 150 is accessible to web browser 140. FIG. 1 is intended merely as one example and not as an architectural limitation for the present invention.

Figure 2:
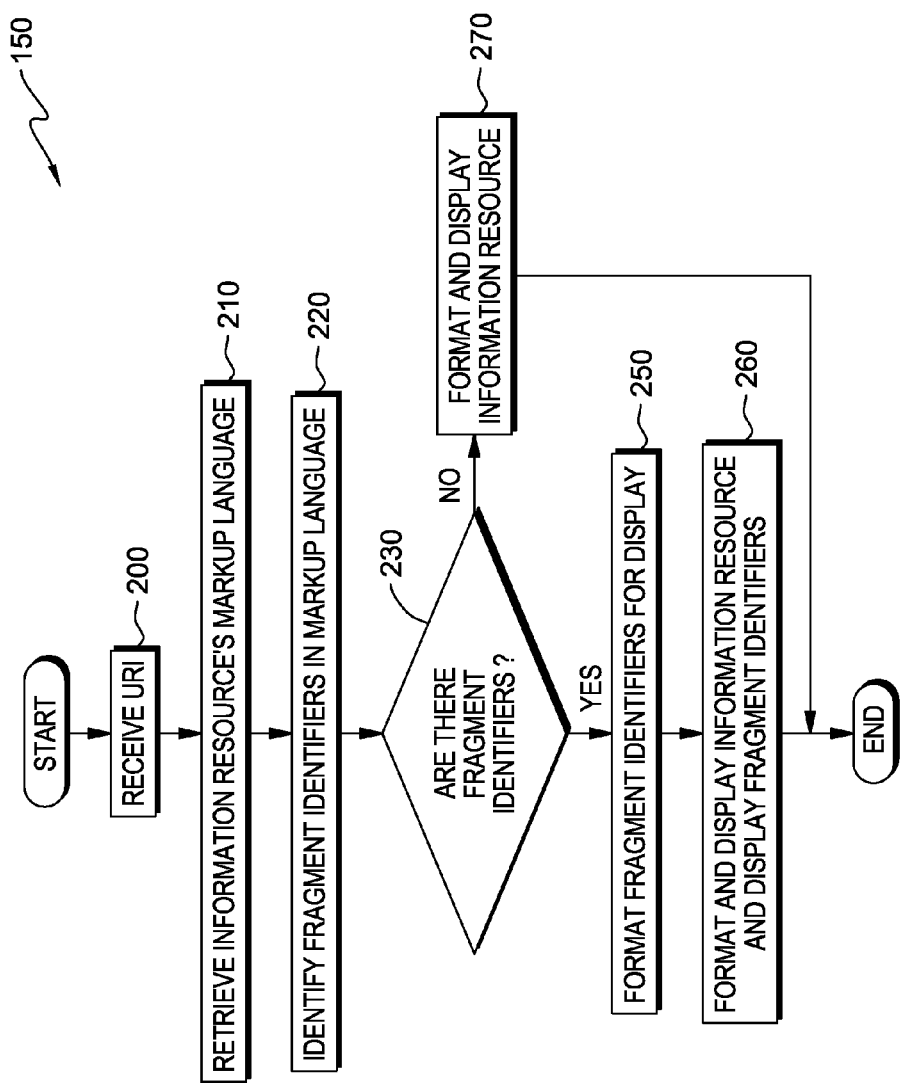
FIG. 2 is a flowchart depicting operational steps of a fragment identifier program executing within the data processing environment of FIG. 1, for identifying and exposing fragment identifiers of an information resource, in accordance with one embodiment of the present invention.

FIG. 2 is a flowchart illustrating a fragment identifier program 150, executing within the data processing environment of FIG. 1, in accordance with an embodiment of the present invention. Fragment identifier program 150 operates to identify and expose fragment identifiers present within the markup language document of information resource 160, in accordance with an illustrative embodiment.

In one embodiment, initially, a web developer or other user may create information resource 160. Information resource 160 may be, for example, a web page, web site, image, video, or other type of information content. In some embodiments, fragment identifier program 150 is initiated when web browser 140 navigates to information resource 160. In another embodiment fragment identifier program 150 may be initiated when web browser 140 is prompted.

In step 200, fragment identifier program 150 receives information resource 160's user information resource (URI). In some embodiments, information resource 160's URI is a web address, such as a URL. In some embodiments, web browser 140 may receive information resource 160's URI from a user, such as when a user inputs a URI into the address bar of web browser 140. In other embodiments, web browser 140 receives information resource 160's URI from a different information resource or another outside source, such as, for example, by following a hyperlink at a first information resource to the URI associated with information resource 160.

In step 210, fragment identifier program 150 retrieves the markup language document that describes information resource 160 from server 130, via network 110. Web browser 140 uses information resource 160's URI to identify and retrieve the markup language document from server 130 via network 110. Web browser 140 uses instructions located within information resource 160's markup language document to take actions and arrange or otherwise present information resource 160.

In step 220, fragment identifier program 150 identifies fragment identifiers in information resource 160's markup language document. A fragment identifier is a string of characters that refers to a section within an information resource, such as a specific paragraph, a specific section, an image, a video, a timestamp within a video, a hyperlink, or any other separate section or element within an information resource. If, for example, information resource 160's markup language is in HTML, information resource's HTML may include the string "id="second_paragraph"". This string identifies a section within information resource 160 associated with the fragment identifier "id="second_paragraph"". In this example the section within information resource 160 is the second paragraph, as denoted by the fragment identifier "second paragraph." The syntax and description of fragment identifiers may be dependent upon the markup language used to describe information resource 160. In some embodiments information resource 160 may not have any fragment identifiers. In other embodiments information resource 160 may have one or more fragment identifiers. In some embodiments fragment identifier program 150 will parse through information 160's markup language document to determine if information resource 160 contains fragment identifiers.

In some embodiments, fragment identifier program 150 parses through information resource 160's markup language to identify fragment identifiers. In some embodiments web browser 140 may perform a query expression in the web browser's scripting language (e.g., JavaScript's jQuery: $("[id], [name]")) to identify fragment identifiers within the scripting language. In other embodiments fragment identifier program 150 may identify fragment identifiers within information resource 160 according to another known manner.

In decision 230, fragment identifier program 150 determines if there are fragment identifiers within information resource 160's markup language document. If fragment identifier program 150 determines that there are fragment identifiers within information resource 160's markup language document (yes branch, decision 230), fragment identifier program 150 formats fragment identifiers for display (see step 250). If fragment identifier program 150 determines that there are not fragment identifiers within information resource 160's markup language document (no branch, decision 230), fragment identifier program 150 formats and displays the information resource for display (see step 270). Web browser 140 uses instructions within information resource 160's markup language to format information resource 160 for display.

In step 250, fragment identifier program 150 formats indications of fragment identifier(s) for display on web browser 140 to a user. In one embodiment, fragment identifier program 150 may append a horizontal line, or other indicator, alongside or on web browser 140's vertical or horizontal scroll bar and coplanar to the sections within information resource 160 that are associated with a fragment identifier. In another embodiment, fragment identifier program 150 may activate a right click feature within web browser 140 such that if a user right clicks or performs another action, a pop-up menu or other context menu will indicate that information resource 160 has fragment identifiers (e.g., text of symbols specifying "copy link to this section" indicating that a user may copy the link to a clipboard or "bookmark to this section" indicating that a user may store this section in web browser 140). In another embodiment, fragment identifier program 150 may append a hyperlink onto the web document indicating that information resource 160 has fragment identifiers at the beginning of each identifiable section. In still another embodiment, fragment identifier program 150 may append a graphical user interface (GUI) that allows a user to take action, such as copy the fragment identifier to a clipboard or command web browser to save the fragment identifier as a bookmark. In still another embodiment, fragment identifier program 150 may alter the appearance of the location within information resource 160 corresponding to the fragment identifier (e.g., highlighting different sections or changing background colors). Fragment identifier program 150 may also format fragment identifiers for display in other ways, provided fragment identifier program 150 alerts or otherwise indicates to a user, sections, or elements associated with fragment identifiers. In some embodiments, fragment identifier program 150 is customizable such that a user can select preferences that will cause web browser 140, fragment identifier program 150, and/or some other program to display fragment identifiers according to the selected preferences of the user.

In step 260, fragment identifier program 150 displays information resource 160 and the fragment identifiers as formatted (see step 250). In one embodiment, fragment identifier program 150 uses web browser 140's scripting language to display fragment identifiers to a user. Fragment identifier program 150 may cause web browser 140's scripting language to interpret information resource 160's markup language, follow the markup language's formatting instructions, display information resource 160 (e.g., a web document, image, or video), and to display the fragment identifiers and information resource 160 to a user such as a user at client 120.

In step 270, fragment identifier program 150 causes web browser 140 to utilize web browser 140's scripting language to interpret information resource 160's markup language, follow the markup language's formatting instructions, and display information resource 160 (e.g., a web document, image, or video).

Figure 3:
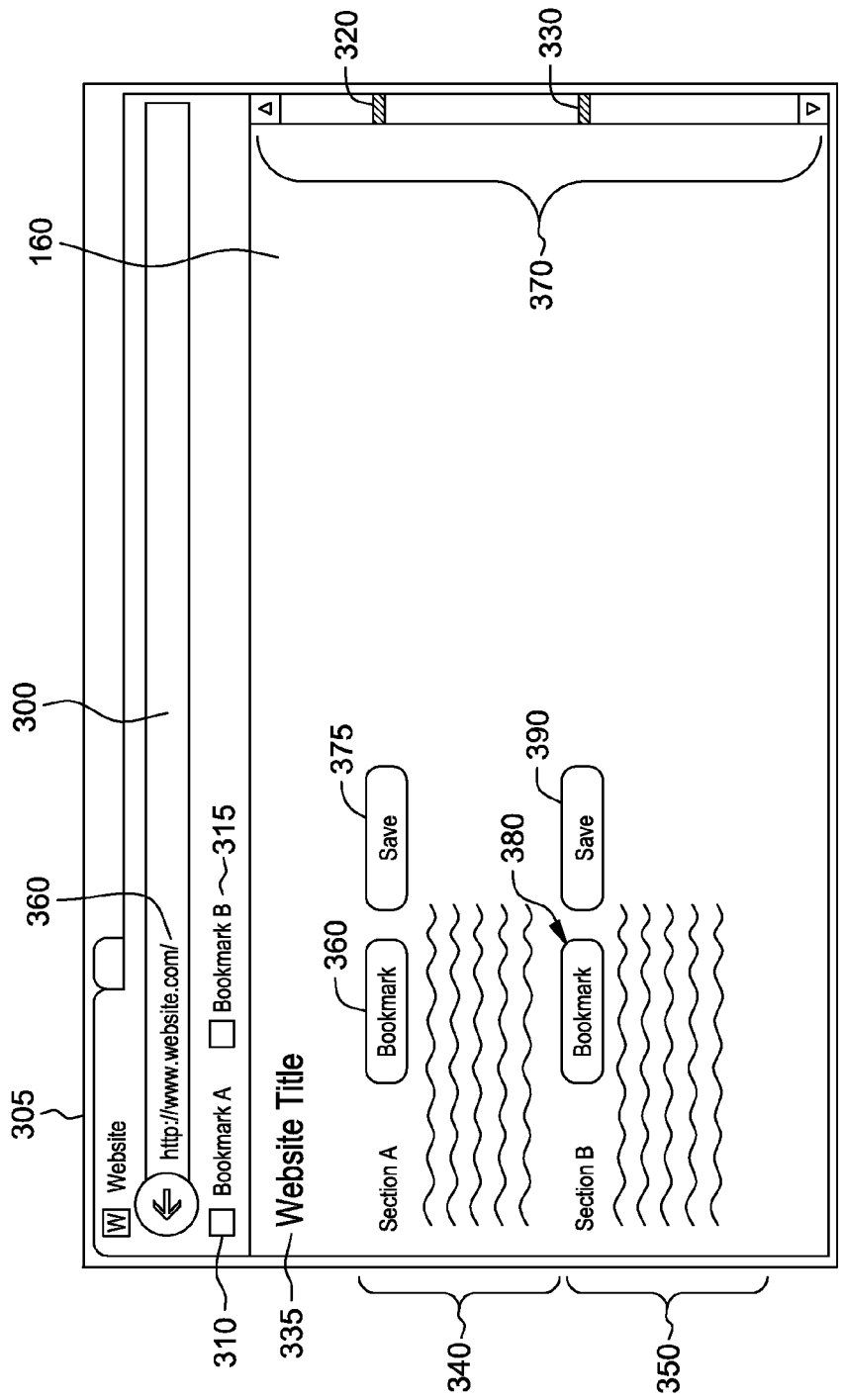
FIG. 3 is an example graphical user interface illustrating the output of a fragment identifier program within a web browser, in accordance with one embodiment of the present invention.

FIG. 3 is an illustrative graphical user interface (GUI) for an information resource as accessed by a web browser and a fragment identifier program, in accordance with one embodiment of the present invention. Web browser window 305 may be a GUI window for information resource 160 of server 130 as viewed by a user at client 120 using web browser 140.

FIG. 3 depicts web browser window 305, as generated by web browser 140, and displays information resource 160 as instructed by information resource 160's markup language document. Web browser window 305 further includes example GUI elements generated by fragment identifier program 150 that expose fragment identifiers to a user. In the depicted example, information resource 160 is a web page. In the depicted example, URI 360 is the URI associated with information resource 160. URI 360 is depicted as the uniform resource locator (URL) within address bar 300.

Web browser window 305 displays website title 335 and two sections, section 340 and section 350. Web browser 140 displays section 340 and 350 as having the headings "Section A" and "Section B", respectively. Section 340 is a first section within information resource 160 that has an associated fragment identifier in information resource 160's markup language document. Section 350 is a second section within information resource 160 that has an associated fragment identifier in information resource 160's markup language document.

In one embodiment of the present invention, web browser 140 uses scrollbar 370 to display fragment identifier locations, identified by fragment identifier program 150, to the user. A scrollbar is a GUI that allows a user to scroll through an information resource. Scrolling is sliding text, images, or videos across web browser 140 vertically or horizontally. Scrolling does not typically change the layout of the information resource but allows the user's view of the information resource 160 on web browser 140 to move across what is apparently a larger image that is not wholly seen on the attached display device.

FIG. 3 illustrates a vertical scrollbar 370. Located on scrollbar 370 are two horizontal indicator bars: horizontal indicator bar 320 and horizontal indicator bar 330. In one embodiment, fragment identifier program 150 will cause web browser 140 to generate horizontal indicator bars 320 and 330 to visually illustrate the sections of information resource 160 associated with fragment identifiers. Horizontal indicator bar 320 corresponds to section 340. In the depicted example, horizontal indicator bar 330 corresponds to section 350. In the depicted embodiment, both bars are visually level with their corresponding section and provide a visual indicator that fragment identifiers are present in information resource 160's markup language document. In another embodiment, horizontal indicator bar 320 and horizontal indicator bar 330 may expand vertically based on the length of the section associated with the fragment identifier. In yet another embodiment, each horizontal indicator bar (e.g., horizontal indicator bar 320 and horizontal indicator bar 330) may be a separate color or may be identified by separate visual patterns. In such an embodiment, separate colors may avoid confusion in user interpretation if two sections associated with separate fragment identifiers are located close to one another. In one embodiment (not shown), fragment identifier program 150 will cause web browser 140 to change the background color, font, or another aspect of the location specified by the associated fragment identifier in order to highlight or otherwise identify the location. In such an embodiment, each location specified by an associated fragment identifier may appear different with respect to other locations associated with other fragment identifiers (e.g., a unique background is used for each location associated with a fragment identifier).

In some embodiments, web browser 140 has a bookmark feature. A bookmark is a URI that is stored for later retrieval, such as for easy access to a frequently visited web page or other information resource. In the depicted embodiment, bookmark icons 310 and 315 appear below address bar 300. When one of web browser 140's bookmark icons (e.g., bookmark icon 310 or bookmark icon 315) is selected, web browser 140 retrieves the stored URI and navigates to an information resource corresponding to the selected bookmark. In some embodiments of the present invention, fragment identifier program 150 generates bookmarking icon 360. Bookmarking icon 360 is a selectable element that corresponds to section 340. If a user selects bookmarking icon 360, web browser 140 stores section 340's fragment resource identifier as a bookmark within web browser 140. Web browser 140 may then generate a bookmark icon similar to bookmark icons 310 and 315 or alternatively store the bookmark within a menu (not shown). In such an example, if the generated bookmark icon, similar to bookmark icons 310 and 315, were to be selected, web browser 140 will retrieve section 340's fragment resource identifier and navigate to section 340 within information resource 160. If a user were to select bookmarking icon 380, web browser 140 may follow a similar process, corresponding to section 350.

In another embodiment of the present invention, fragment identifier program 150 appends copying hyperlink icon 375 and copying hyperlink icon 390 to information resource 160. Copying hyperlink icon 375 is a selectable element that allows a user to copy the URI corresponding to section 340 and its fragment identifier. Copying hyperlink icon 390 is a selectable element that similarly corresponds to section 350 and its fragment identifier. In some embodiments, web browser 140 will allow a user to copy the fragment resource identifier to a clipboard if the user selects a particular copying hyperlink icon (e.g., copying hyperlink icon 375 or copying hyperlink icon 390). This may allow the user to paste the fragment resource identifier to another location, email the fragment resource identifier, or perform other actions with the fragment resource identifier. In some embodiments of the present invention, fragment identifier program 150 may cause web browser 140 to generate additional types of indicators identifying and/or exposing fragment identifiers associated with an information resource, such as information resource 160. In some embodiments, fragment identifier program 150 may cause varying combinations of the previously described indicators to be presented to a user.

FIG. 3 depicts several example GUIs displayed within web browser 140. FIG. 3 is meant to illustrate example GUIs that embodiments of the present invention may cause to be presented within a web browser, such as web browser 140. Fragment identifier program 150 may use other GUIs (not shown) to expose fragment identifiers to a user. Further, embodiments of the present invention recognize that fragment identifier program 150 may cause fragment identifiers to be exposed to a user outside of web browser 140. For example, fragment identifier program 150 may cause a separate pop-up window, or other web browser window or menu to be displayed to a user exposing, alerting or otherwise identifying a user as to the existence and/or location within information resource 160 of identified fragment identifiers. FIG. 3 is intended as an illustrative example and not as an architectural limitation for the present invention.

Figure 4:
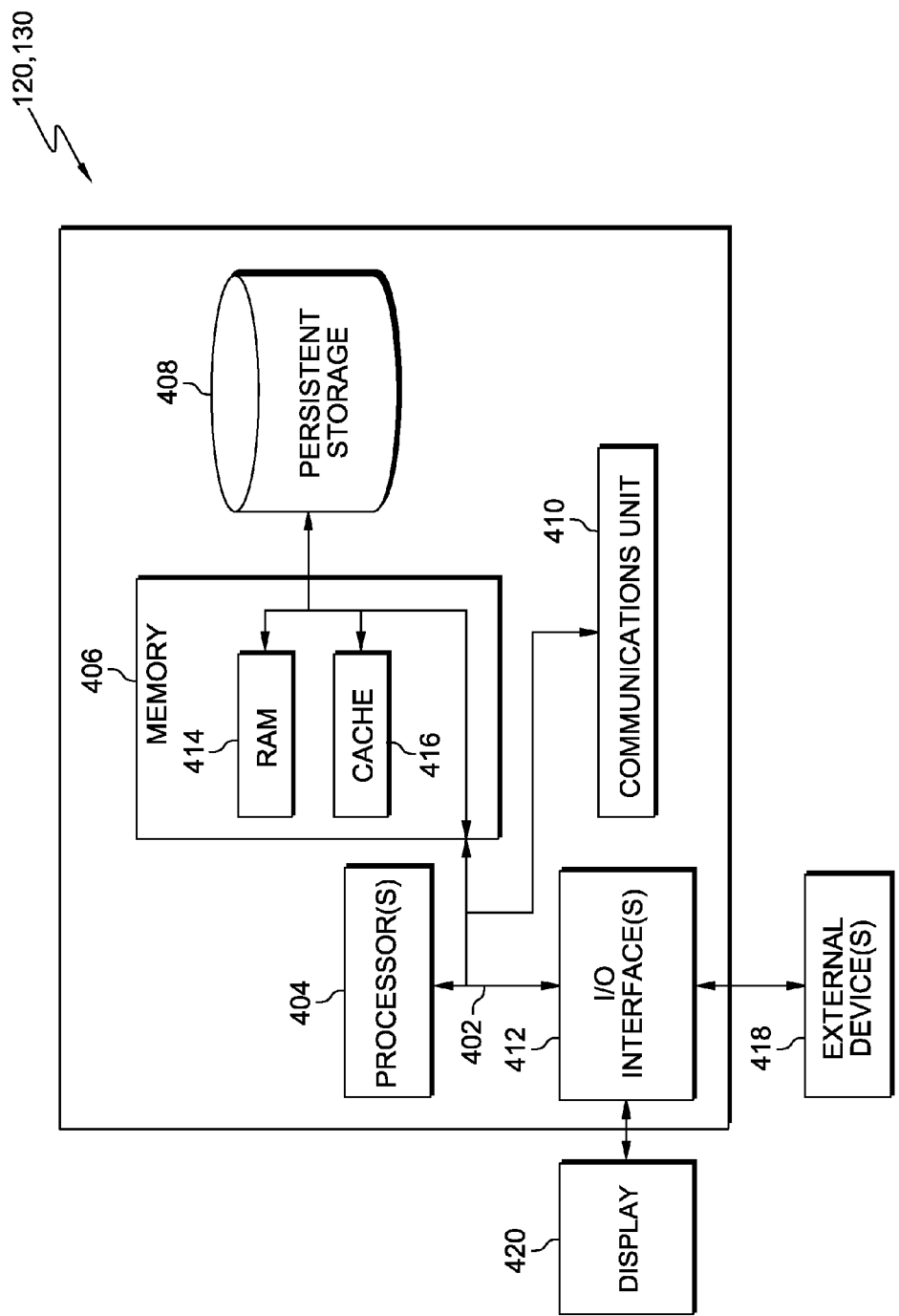
FIG. 4 is a block diagram of components of the server and client of FIG. 1, in accordance with one embodiment of the present invention.

FIG. 4 depicts a block diagram of components of server computer 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 130 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Web browser 140 and fragment identifier program 150 are stored in persistent storage 408 of client 120 for execution by one or more of the respective computer processors 404 of client 120 via one or more memories of memory 406 of client 120. Information resource 160 is stored in persistent storage 408 of server 130 for execution by one or more of the respective computer processors 404 of server 130 via one or more memories of memory 406 of client 120. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Web browser 140 and fragment identifier program 150 may be downloaded to persistent storage 408 of client 120 through communications unit 410 of client 120. Information resource 160 may be downloaded to persistent storage 408 of server 130 through communications unit 410 of server 130.

I/O interface(s) 412 allows for input and output of data with other devices that may be connected to client 120 and server 130. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., web browser 140 and fragment identifier program 150, can be stored on such portable computer readable storage media and can be loaded onto persistent storage 408 of client 120 via I/O interface(s) 412 of client 120. Software and data used to practice embodiments of the present invention, e.g., information resource 160, can be stored on such portable computer readable storage media and can be loaded onto persistent storage 408 of server 130 via I/O interface(s) 412 of server 130. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, from a server and through a communications network, a first web page data set: (i) including information indicative of a first web page display, (ii) being structured and formatted according to a markup language, (iii) being identified by a first Uniform Resource Identifier (URI), (iv) further including a plurality of fragment identifiers, with each fragment identifier, of the plurality of fragment identifiers, being: (a) in the form of a strings of characters that identifies a specific section within the first web page display, and (b) identified by a respectively corresponding URI that includes the first URI followed by a hash mark, which is followed by a respectively corresponding fragment identifier string;
   creating a second web page display data set including information indicative of the first web page display and a plurality of clickable bookmark buttons respectively corresponding to the plurality of fragment identifiers, with each clickable bookmark button being selectable by user input to bookmark the respectively corresponding fragment identifier;
   displaying, through a web browser and on a display device, a first web page display corresponding to the second web page display data set;
   receiving from a user and through a user interface, a selection of a first clickable bookmark button of the plurality of clickable bookmark buttons; and
   responsive to the selection of the first clickable bookmark button, bookmarking, by the browser, a first URI corresponding to a first fragment identifier, of the plurality of fragment identifiers, that corresponds to the first clickable bookmark button.

2. A computer program product comprising:
   a machine readable storage device; and
   computer code stored on the machine readable storage device, with the computer code including instructions for causing a processor(s) set to perform operations including the following:
   receiving, from a server and through a communications network, a first web page data set: (i) including information indicative of a first web page display, (ii) being structured and formatted according to a markup language, (iii) being identified by a first Uniform Resource Identifier (URI), (iv) further including a plurality of fragment identifiers, with each fragment identifier, of the plurality of fragment identifiers, being: (a) in the form of a strings of characters that identifies a specific section within the first web page display, and (b) identified by a respectively corresponding URI that includes the first URI followed by a hash mark, which is followed by a respectively corresponding fragment identifier string,
   creating a second web page display data set including information indicative of the first web page display and a plurality of clickable bookmark buttons respectively corresponding to the plurality of fragment identifiers, with each clickable bookmark button being selectable by user input to bookmark the respectively corresponding fragment identifier,
   displaying, through a web browser and on a display device, a first web page display corresponding to the second web page display data set,
   receiving, from a user and through a user interface, a selection of a first clickable bookmark button of the plurality of clickable bookmark buttons, and
   responsive to the selection of the first clickable bookmark button, bookmarking, by the browser, a first URI corresponding to a first fragment identifier, of the plurality of fragment identifiers, that corresponds to the first clickable bookmark button.

3. A computer system comprising:
   a processor(s) set;
   a machine readable storage device; and
   computer code stored on the machine readable storage device, with the computer code including instructions for causing the processor(s) set to perform operations including the following:
   receiving, from a server and through a communications network, a first web page data set: (i) including information indicative of a first web page display, (ii) being structured and formatted according to a markup language, (iii) being identified by a first Uniform Resource Identifier (URI), (iv) further including a plurality of fragment identifiers, with each fragment identifier, of the plurality of fragment identifiers, being: (a) in the form of a strings of characters that identifies a specific section within the first web page display, and (b) identified by a respectively corresponding URI that includes the first URI followed by a hash mark, which is followed by a respectively corresponding fragment identifier string,
   creating a second web page display data set including information indicative of the first web page display and a plurality of clickable bookmark buttons respectively corresponding to the plurality of fragment identifiers, with each clickable bookmark button being selectable by user input to bookmark the respectively corresponding fragment identifier,
   displaying, through a web browser and on a display device, a first web page display corresponding to the second web page display data set, receiving, from a user and through a user interface, a selection of a first clickable bookmark button of the plurality of clickable bookmark buttons, and responsive to the selection of the first clickable bookmark button, bookmarking, by the browser, a first URI corresponding to a first fragment identifier, of the plurality of fragment identifiers, that corresponds to the first clickable bookmark button.

* * * * *